(12) United States Patent
Carter

(10) Patent No.: US 10,613,769 B2
(45) Date of Patent: Apr. 7, 2020

(54) ENCODED PARITY

(71) Applicant: Joshua Daniel Carter, Lafayette, CO (US)

(72) Inventor: Joshua Daniel Carter, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 15/381,066

(22) Filed: Dec. 15, 2016

(65) Prior Publication Data
US 2017/0168741 A1 Jun. 15, 2017

Related U.S. Application Data

(60) Provisional application No. 62/267,680, filed on Dec. 15, 2015.

(51) Int. Cl.
*G06F 3/06* (2006.01)
*G11B 20/18* (2006.01)
*G06F 11/00* (2006.01)

(52) U.S. Cl.
CPC ............ *G06F 3/0619* (2013.01); *G06F 3/064* (2013.01); *G06F 3/0643* (2013.01); *G06F 3/0647* (2013.01); *G06F 3/0686* (2013.01); *G06F 11/00* (2013.01); *G11B 20/1833* (2013.01); *G11B 2020/1836* (2013.01)

(58) Field of Classification Search
CPC ...... G06F 3/0619; G06F 3/064; G06F 3/0643; G06F 3/0647; G06F 3/0686; G06F 11/00; G11B 20/1833; G11B 2020/1836
See application file for complete search history.

(56) References Cited

U.S. PATENT DOCUMENTS

| | | | | | |
|---|---|---|---|---|---|
| 5,351,246 | A | * | 9/1994 | Blaum | G06F 11/1092 714/6.21 |
| RE36,448 | E | * | 12/1999 | Brady | G11B 20/1833 714/48 |
| 6,529,996 | B1 | * | 3/2003 | Nguyen | G06F 3/0626 711/114 |
| 7,111,147 | B1 | * | 9/2006 | Strange | G06F 3/0607 711/114 |
| 2002/0004883 | A1 | * | 1/2002 | Nguyen | G06F 3/0613 711/111 |

(Continued)

*Primary Examiner* — Francisco A Grullon
(74) *Attorney, Agent, or Firm* — Kenneth Altshuler

(57) ABSTRACT

A magazine-based data storage library in connection with a disk drive-based archive storage system is described that essentially generates parity data for tape formatted data streams (stored to tape cartridges) that do not align by way of data blocks or file marks. Data streams intended for tape storage sent to tape cartridges are also sent to a disk drive storage system via an encoder where parity of the data streams can be generated. More specifically, the encoder digitally formats tape blocks and tape marks (as well as other tape formatted structure) in a digital stream of data that can be added to other encoded digital streams of data to generate parity. To reconstruct a specific tape cartridge from a tape set, the encoded data from each of the tapes in the tape set are subtracted from the parity data and the remaining encoded data is decoded and sent to a designated tape cartridge.

11 Claims, 16 Drawing Sheets

(56) References Cited

U.S. PATENT DOCUMENTS

| | | | |
|---|---|---|---|
| 2011/0238716 A1* | 9/2011 | Amir | G06F 3/0611 |
| | | | 707/823 |
| 2011/0238905 A1* | 9/2011 | Amir | G11B 23/042 |
| | | | 711/111 |
| 2012/0323934 A1* | 12/2012 | Amir | G06F 17/30091 |
| | | | 707/752 |
| 2013/0326136 A1* | 12/2013 | Carter | G06F 3/0604 |
| | | | 711/111 |
| 2014/0195633 A1* | 7/2014 | Carter | G06F 17/30073 |
| | | | 709/213 |
| 2016/0117222 A1* | 4/2016 | Blaum | G06F 11/1076 |
| | | | 714/771 |
| 2016/0139824 A1* | 5/2016 | Hasegawa | G06F 3/0686 |
| | | | 711/112 |
| 2017/0168738 A1* | 6/2017 | Thompson | G06F 3/0619 |
| 2017/0185481 A1* | 6/2017 | Fan | G06F 11/1076 |

\* cited by examiner

ENCODED PARITY

CROSS-REFERENCE TO RELATED APPLICATIONS

This application is a non-provisional application which claims priority to and the benefit of U.S. Provisional Patent Application Ser. No. 62/267,680, entitled Encoded Parity filed Dec. 15, 2015, the entire disclosure of which is hereby incorporated by reference.

FIELD OF THE INVENTION

The present embodiments are directed to a method for constructing parity in a data cartridge set.

DESCRIPTION OF RELATED ART

Presently, data cartridge magazine libraries transfer tape cartridges via a data cartridge magazine between a shelf system and a tape drive. When a target tape cartridge is accessed, (for reading and/or writing data) the target tape cartridge, which in this case is disposed in a magazine, is moved from a shelf system and loaded in the target tape drive. Sometimes, a magazine contains a set of tape cartridges that are related in some manner, typically through related data. If data is lost on one of the tape cartridges that makes up the set, the entire set of related tape cartridges may become compromised. This can be resolved with a Redundant Array of Independent Tapes (RAIT), whereby if one tape cartridge is compromised, the set can be rebuilt and the data recouped.

Redundant Array of Independent Tapes (RAIT) provides a parity tape cartridge that is written while a plurality of other tapes comprising a tape set, or group, are written in parallel. In other words, if there is a tape set of four cartridges and one parity tape cartridge, each of the five tape cartridges are loaded in a respective tape drive (five tape drives) and all five tape drives write data to each of the five tape cartridges in parallel. Typically, before a parity tape cartridge can be built from preexisting tape cartridges, all of the preexisting tape cartridges must have common sized blocks and layouts to align the bits.

It is to innovations related to this subject matter that the claimed invention is generally directed.

SUMMARY OF THE INVENTION

The present embodiments generally relate to a cartridge magazine-based library further using random access memory cache as part of an archive storage system with an archive storage controller possessing archive storage, such as one or more hard disk drives for example, to provide redundant data in the form of parity construction when storing data to a tape set to address issues around losing data from one of the tapes in the tape set. Some embodiments of the present invention contemplate a method comprising: providing a first operations stream and the second operations stream, each of the operations streams possessing a plurality of data blocks separated by tape marks or by predesignated data sizes; storing the first operations stream to a first tape cartridge and the second operations stream to a second tape cartridge; encoding all of the first operations stream in at least a first sequential digital form and all of the second operations stream in at least a second sequential digital form; generating parity data from the first digital form and the second digital form; and storing the first parity of data.

Yet other embodiments of the present invention can therefore comprise a a method comprising: providing a host computer in communication with a computer server, the computer server communicatively linked with a plurality of random access storage devices, a tape device driver, an encoding engine, and a tape cartridge library, the tape library possessing at least one tape drive, a first, a second and a third tape cartridge; the computer server receiving a incoming first set of files, or more broadly a data object or objects from the host computer; the server conditioning the incoming first set of files into a first data stream possessing instructions segmenting the incoming first set of files at least into a plurality of first data blocks and first tape marks; sending the first data stream to the tape cartridge library via the tape device driver; formatting for tape the first data stream via the tape device driver; migrating the formatted first data stream to one of the tape drives that is engaged with the first tape cartridge; storing the formatted first data stream to the first tape cartridge via the tape drive; sending the first data stream to the encoding engine; encoding all of the first data stream in a form that is sequential via the encoding engine; storing the first encoded data stream to the random storage access devices; the computer server receiving an incoming second set of files from the host computer; the server conditioning the incoming second set of files into a second data stream possessing instructions segmenting the incoming second set of files at least into a plurality of second data blocks and second tape marks; sending the second data stream to the tape cartridge library via the tape device driver; formatting for tape the second data stream via the tape device driver; migrating the formatted second data stream to one of the tape drives that is engaged with the second tape cartridge; storing the formatted second data stream to the second tape cartridge via the one of the tape drives; sending the second data stream to the encoding engine; encoding all of the second data stream in the form that is sequential via the encoding engine; generating parity data of the first encoded data stream with the second encoded data stream; storing the parity data to the random storage access devices; loading the third tape cartridge in one of the tape drives; sending the parity data from the random storage access devices to the tape device driver; migrating the parity data from the tape device driver to one of the third tape cartridge loaded in one of the tape drives; after the migrating step, storing the parity data to the third tape cartridge; designating the third tape cartridge a parity tape cartridge after storing the parity data to the third tape cartridge; removing the parity data from the random storage access device; retrieving the parity data from the parity tape cartridge via one of the tape drives; sending the parity data to the plurality of random storage access devices via the tape device driver; storing the parity data to the random access storage devices; regenerating the second data stream from the second tape cartridge via the tape device driver; migrating the second data stream from the tape device driver to the encoding engine; encoding the second data stream; generating the encoded first data stream by subtracting the encoded second data stream from the parity data; retaining the encoded first data stream on the random access storage devices; providing a decoding engine; decoding the encoded first data stream from the random access storage devices via the decoding engine; sending the decoded first data stream to the tape device driver; formatting for tape the first stream via the tape device driver; migrating the formatted first data stream to one of the tape drives that is engaged with a fourth tape cartridge; storing the formatted first data stream to the fourth tape cartridge via the one of the tape drives; replacing the first tape cartridge with the fourth tape cartridge.

And, yet other embodiments of the present invention contemplate a method comprising: sending a first set of data files to a computer server system from a host computer; conditioning the first set of data files to a first data stream for tape storage, the first data stream possessing data blocks separated by tape marks; converting the first data stream to a tape format via a tape device driver; compressing the converted first data stream data blocks at a compression ratio; storing the compressed first data stream to a first tape cartridge via a tape drive; compressing and encoding the first data stream data blocks at approximately the compression ratio into a compressed first data stream into digital representation; storing the encoded compressed first data stream to a random access storage system in a sequential format; sending second set of data files to the computer server system from the host computer; conditioning the second set of data files to a second data stream for tape storage, the second data stream possessing data blocks separated by tape marks; converting the second data stream to the tape format via the device driver; compressing the converted second data stream data blocks at approximately the compression ratio; storing the compressed second data stream to a second tape cartridge via the tape drive or a different tape drive; compressing and encoding the second data stream data blocks at approximately the compression ratio into a compressed second data stream into digital representation; constructing parity data from the encoded compressed first data stream and the encoded compressed second data stream; storing the parity data to the random access storage system in the sequential format; transmitting the parity data from the random access storage system to a third tape cartridge engaged with one of the tape drives via the device driver; storing the parity data on the third tape cartridge; removing the parity data from the random access storage system; sending the parity data to the random access storage system via the device driver from the third tape cartridge being read by one of the tape drives; sending the first data stream to the encoder via the device driver from the first tape cartridge being read by one of the tape drives wherein the first data stream is uncompressed; encoding the first data stream and compressing the first data stream data blocks at approximately the compression ratio; generating the encoded and compressed second data stream by subtracting the encoded and compressed first data stream from the parity data stored on the random access storage system; decoding and decompressing the encoded and compressed second data stream via a decoder and decompressor; transmitting the second data stream from the decoder to a fourth tape cartridge, for storage, engaged with one of the tape drives via the device driver, the second data stream compressed when stored to the fourth tape cartridge.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of parity to protect against data loss. In what follows, similar or identical structures may be identified using identical callouts.

Figure 1:
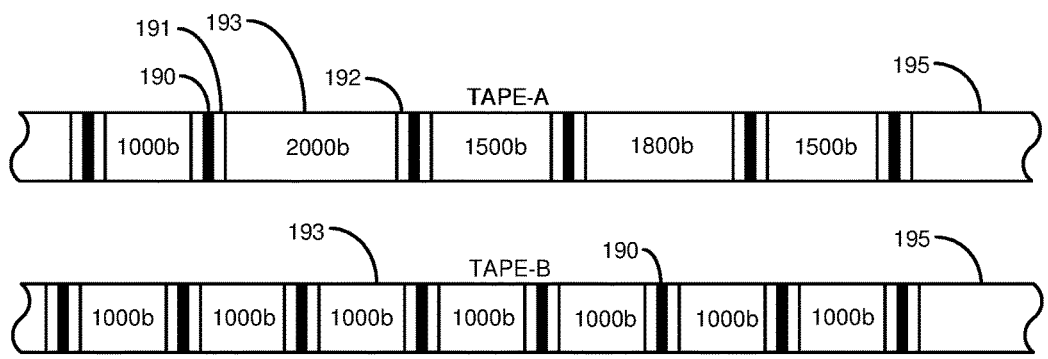
FIG. 1 depicts two different tape formats, a first tape format possessing different sized data blocks, or records, and a second tape format possessing equal sized data blocks.

Certain embodiments described herein are directed to solving a problem of creating a parity tape cartridge for a group of tape cartridges that have varied data block sizes. For example, as depicted in FIG. 1, Tape-A has varied sized data blocks 193 ranging from 1000 bytes to 2000 bytes. Tape-B has uniformly sized data blocks 193 of 1000 bytes. As illustratively shown, the data blocks 193 are separated by tape marks 190, which are interposed between header metadata 191 and trailer metadata 192. Tape marks 190 are considered "speed bumps" delineating each data block 193.

They do not correspond to digital 1's and 0's because they are often high-frequency and potentially high amplitude signals. Tape marks 190 facilitate the rapid rewinding or rapid fast forwarding of a tape medium 195 to locate a specific place on the tape medium 195 quickly without having to read the data between the tape marks 190. Tape medium 195 is wound on reels inside of a tape cartridge 120.

Given the dynamic nature of a tape cartridge 120, there is a danger that data residing on the tape medium 195 may become corrupt due to damage or potentially lost altogether. Accordingly, certain failsafe techniques, such as use of Redundant Array of Tapes (RAITs), can be employed using one or more parity tape cartridges in a designated set of tape cartridges. A parity tape cartridge from a particular tape set can be used to rebuild a missing or damaged tape cartridge from the tape set. Thus, if data is lost on any one of the tape cartridges in the tape set, the data can be recovered using the parity tape cartridge along with the other tape cartridges. Fundamentally, in one XOR example, if the first data bit from a first tape cartridge is a "1", the first data bit from a second tape cartridge is a "0", and the first data bit from a third tape cartridge is a "1", then the parity bit would be a "0". If, for example, the first data bit from the second tape cartridge is lost, the first data bit from the second tape cartridge can be reconstructed from the parity bit by calculating the first bits of the first tape cartridge and the third tape cartridge equaling the parity tape cartridge, or 1+?+1=0. From the simple equation, the "?" (corresponding to the first bit of the second tape cartridge) must be a "0". Because the data bits must align, traditionally when attempting to create parity information from two or more tape cartridges 120, the tape formats, especially the tape marks 190, need to align. Also traditionally, tape cartridges using RAIT have identical tape formats and identical sized data blocks 193 to effectively generate parity. However, when it is desirous to create a parity tape of Tape-A and Tape-B having different sized data blocks and tape marks that do not align, techniques consistent with embodiments of the present invention described herein can be employed. One embodiment, discussed in more detail below, contemplates encoding (via an encoding engine) a data stream that includes all of the data and format commands that are transmitted to a tape driver to create a digital representation of the data and format layout for Tape-A and Tape-B in order to generate a parity tape. In this way, a parity tape can be generated for multiple tape cartridges independent of tape marks, end of tape marks, file marks, other specific tape format structure and alignment for multiple/different tape format structures. Hence, if Tape-B were to become damaged or lost, Tape-B can be reconstructed by using Tape-A with the parity tape regardless of varying tape format structures. Rebuilding Tape-B, in one embodiment, can be accomplished by encoding Tape-A and the parity tape in the common digital representation, e.g., data and file marks, end of tape marks, etc., previously used to create the encoded data in the first place, followed by aligning the data bits to reconstruct the encoded data of Tape-B. The encoded data of Tape-B can then be decoded via a decoder following the same rules as the encoder, but inverse, and the decoded data sent to a tape drive where Tape-B can be fully reconstructed.

Figure 2:
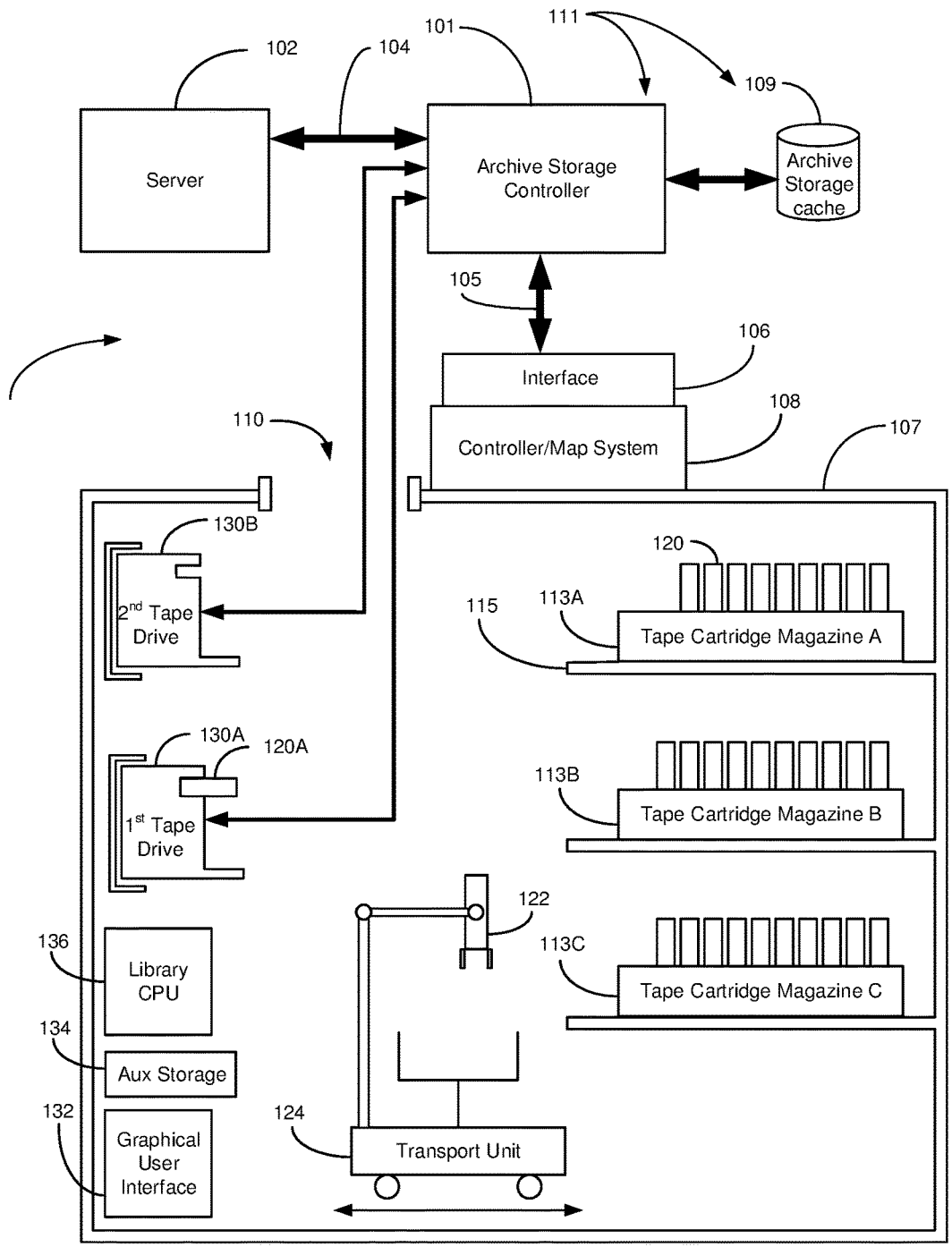
FIG. 2 illustratively depicts an embodiment of a data storage arrangement constructed in accordance with various embodiments of the present invention.

An exemplary environment in which preferred embodiments of the present invention can be practiced is shown in FIG. 2, which depicts an embodiment of a data storage arrangement 100 constructed in accordance with various embodiments of the present invention. The data storage arrangement 100 of FIG. 2 can comprise a server 102, such as a client or host or other user of data, in communication with an archive storage system 111 generally possessing an archive controller 101 and archive storage cache 109, such as a plurality of hard disk drives, the archive storage controller 101 being in communication with a data storage library 107. As illustratively shown, the client 102 is in communication with the tape storage library 107 and archive storage controller 101 via a communication path 104. The archive storage controller 101 is in communication with the tape storage library 107, such as, via a library interface device 106. One embodiment contemplates the archive storage controller 101 in direct communication with the tape drives 130A and 130B, such as through SCSI commands. The tape storage library 107 comprises a plurality of tape cartridges 120 disposed in a tape cartridge magazine, such as tape cartridge magazine 'A' 113A. Herein, tape cartridge magazine 113 will be used to denote a generic cartridge magazine and tape cartridges 120 will be used to denote a generic cartridge. Each tape cartridge magazine 113 contains a plurality of slots (shown in FIG. 3) wherein each slot is adapted to accommodate a tape cartridge 120. A tape cartridge 120 houses at least one reel and a recording tape medium (not shown), generally magnetic, wound around the reel.

Here, the tape storage library 107 may be configured to maintain a map of the slots in each magazine 113. More specifically, each slot in a magazine 113 will have a unique identification, such as an address, that is identifiable by the host computer 102 via a map of logical addresses, which can be provided by the tape storage library 107, and such as a map system 108, in this example. A tape cartridge 120 disposed in a particular slot may assume the identity of the particular slot for purposes of the mapping system 108. Hence, a tape cartridge 120 disposed in a third slot having an address mapped as slot number three will assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.), and can be assigned, or mapped, to a slot, by a host computer 102, for example.

The tape storage library 107 can further comprise at least one robotic transporter 124, though in optional library embodiments, multiple transporters can exist. The robotic transporter 124 comprises a carriage or other transporting means to carry a tape cartridge magazine 113 from the shelf system 115 to a position ready to load a tape cartridge 120 into a tape drive 130A or 130B. Generically, a tape drive is denoted herein as element 130 and is an embodiment of a data transfer device. In the present embodiment, the shelf system 115 is arranged to archive the tape cartridge magazines 113, or independent tape cartridges 120, within the tape storage library 107. A tape drive 130 facilitates data storage operations (such as, reading and writing) to and from a tape cartridge 120 when the tape cartridge 120 is in a cooperating relationship (i.e., engaged with) a tape drive 130. In the present depicted embodiment, the tape drives 130 stores data with more or less a direct communication link with the archive storage controller 101. A robotic transporter 124 in one embodiment is a robotic device that moves along a rail system via a belt device, a motorized rack and pinion arrangement, a lead screw arrangement, a motor with wheels, etc. The tape cartridge 120 can be loaded into or removed from a tape drive 130 via a picker device 122 that is comprised by the robotic transport 124, for example. In an optional embodiment, the tape cartridges 120 may be associated with different users of data, which can occur when the storage resources in the tape storage library 107 are divided into two or more logical partitions wherein each logical partition is associated with the different user of data, for example. Certain embodiments contemplate a transport unit 124 and picker device 122 holding a tape cartridge 120 in a position ready to transfer the tape cartridge 120 into a tape drive 130 from a magazine 113. Such a position is a location where the robotic transport unit 124 and picker device 122 are in possession of a tape cartridge 120. If a tape cartridge 120 is held in a slot on a shelf near a tape drive 130, the tape cartridge 120 is not considered to be in a position ready to transfer a tape cartridge 120 into a tape drive 130 within the scope and spirit of the present invention. In the present embodiment, the position ready to transfer the tape cartridge 120 into a tape drive from a magazine 113 does not require further movement via the robotic transporter 124, rather the picker device 124 moves a cartridge 120 from the magazine 113 to a drive 130.

The tape storage library 107 also optionally comprises an entry/exit port 110 whereby tape cartridges 120 or tape cartridge magazines 113 comprising a plurality of tape cartridges 120 can be transferred between an environment external to the tape storage library 107 and an environment internal to the tape storage library 107. In this embodiment, the tape storage library 107 comprises a graphical user interface 132 and an auxiliary memory 134, such as one or more disk drives, solid state memory or other non-volatile memory device/s capable of retaining (storing) relevant information, such as mapping address information of each tape cartridge 120, for example. The tape storage library 107 further possesses a computer or Central Processing Unit (CPU) 136 that houses at least on macro controller that actively cooperates with algorithms that orchestrate actions to components within the tape storage library 107, for example, over a Computer Area Network (CAN), not shown. The tape storage library 107 possesses a controller/map system 108, which can optionally be functionally included with the CPU 136. The controller/map system 108 maintains the addresses of the components mapped out for the server 102 (i.e., tape slot addresses, drive addresses, robot addresses, etc.) to direct operations within the tape storage library 107. FIG. 2 is illustrative of basic components used to exemplify inventive embodiments in this disclosure. As one skilled in the art will appreciate, a tape storage library will generally include devices and structures not shown in the block illustration of FIG. 2, such as additional controllers (e.g., those controlling other components in the library including the robotic transporter 124), wiring, cooling systems, switch systems, lighting, protocol bridges, etc.

The server 102, or host computer, may be desirous to store data to an archive storage system 111 without knowledge of the tape storage library 107. In the depicted embodiment, the server 102 transmits data 104 to the archive storage system 111 for storage. The archive storage controller 101 essentially caches data from the server 102 in the archive storage cache 109 and controls the tape storage library 107 to load a tape cartridge 120 into one of the tape drives 130 to perform storage operations. Here, the tape storage library 107 is "behind" the archive storage system 111 and is capable of storing far more data than can be stored in the archive storage system 111 alone.

Figure 3:
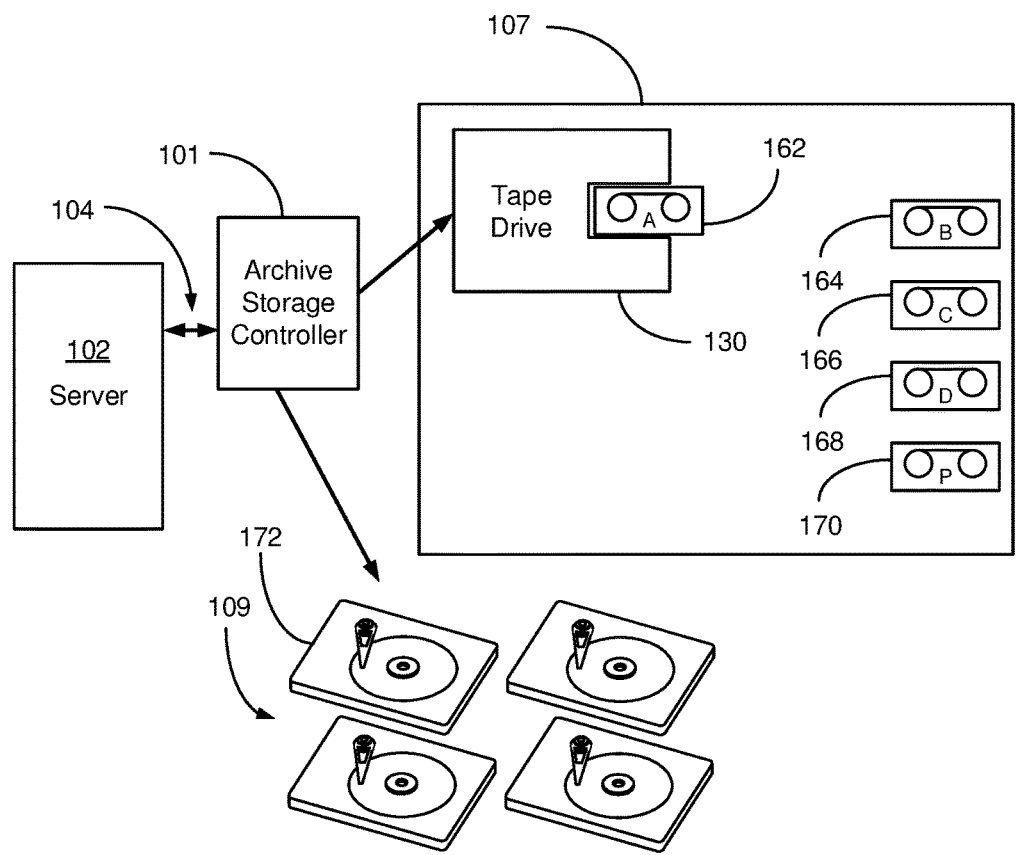
FIG. 3 illustratively depicts a simplified diagram of the tape storage library and components constructed in accordance with certain embodiments of the present invention.

FIG. 3 illustratively depicts a simplified diagram of the tape storage library 107 and components that can be used as exemplary elements for embodiments described herein. As shown, some of the basic components in the tape storage library 107 include a tape drive 130 and a set of related tape cartridges A-P 162-170. With more specificity, tape cartridge 'A' 162 is depicted in a cooperating relationship with the tape drive 130. The archive storage cache 109 can comprise a plurality of magnetic hard disk drives 172 (or other suitable random access storage device, such as flash drives, solid state drives (SSDs), for example). The set of related tape cartridges A-P 162-170 may contain related data for specific server 102, a specific customer, a specific timeframe, a particular subject matter, and the like.

Figure 4:
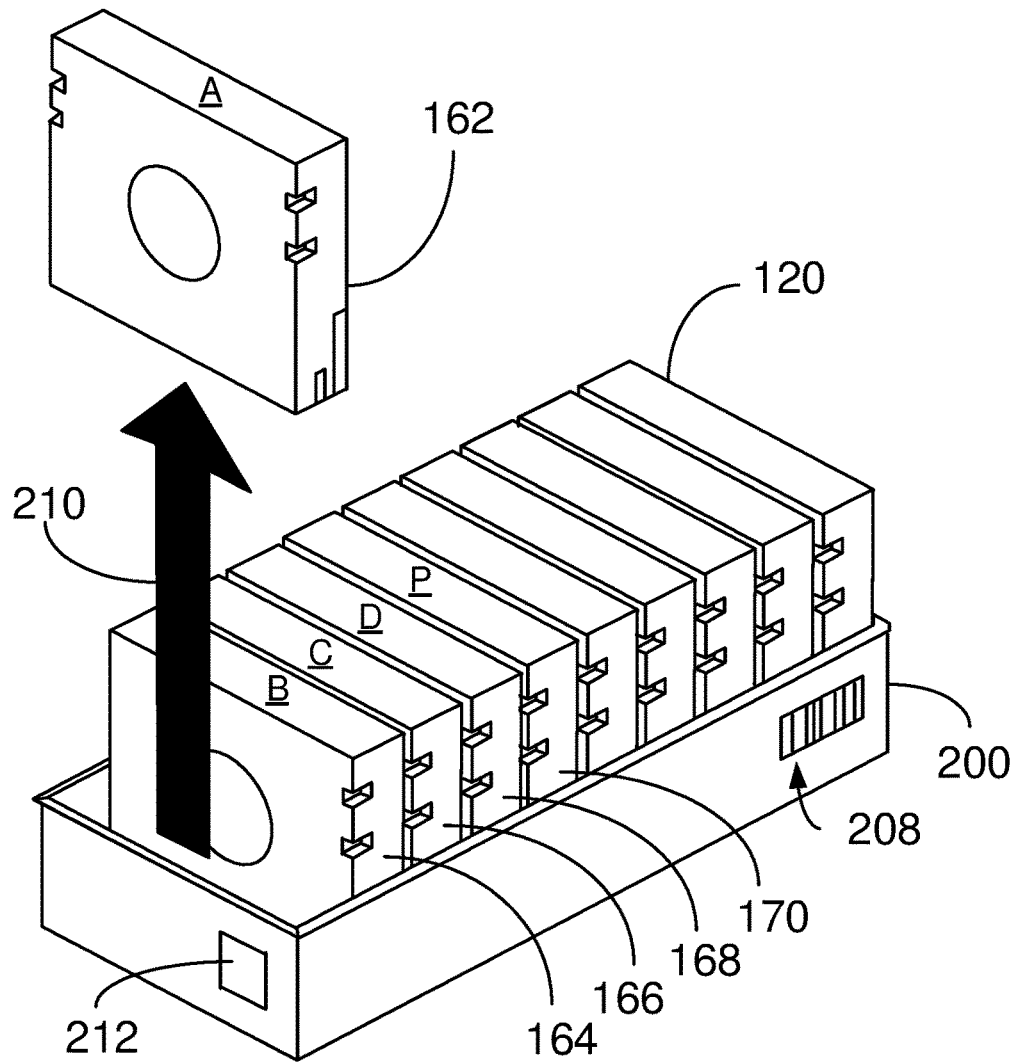
FIG. 4 illustratively depicts a tape cartridge magazine embodiment constructed in accordance with certain embodiments of the present invention.

With reference to FIG. 4, shown therein are tape cartridges 120 supported by a tape cartridge magazine 200 embodiment constructed in accordance with embodiments of the present invention. In more detail, a tape cartridge 120, such as an LTO-6 category tape cartridge, comprises magnetic tape that is capable of storing digital data written by a compatible drive 130, such as an LTO-6 tape drive manufactured by IBM of Armonk, N.Y., when in cooperation to read and write data (i.e., loaded) with the tape cartridge 120, as shown in FIGS. 1 and 2. The tape cartridge magazine 200 is illustratively shown populated with a plurality of tape cartridges 120. A tape cartridge 120 can be removed from the tape cartridge magazine 200, as shown by the arrow 210, and inserted into a tape drive 130 by means of a picker device (not shown). Disposed on the tape cartridge magazine 200 is a bar code identifier 208 for identifying the tape cartridge magazine 200, which has utility should the tape cartridge magazine 200 be archived in a media pack storage vault that is remote from a library (i.e., not in a library), for example. In some embodiments, all tape cartridges 120 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 200 can comprise a magazine auxiliary memory device (not shown) that is capable of containing information (such as tape slot address mapping information, e.g., a tape cartridge corresponding to "slot-1" can retain the identity of "slot-1" on the tape cartridge's MAM) from at least one of the data cartridges 120 disposed in the magazine 200. The magazine auxiliary memory device 212 can receive information that is maintained on the tape cartridge MAM devices contained via one or more MAM device readers/writers associated with a tape drive 130, or some reader not associated with a tape drive 130, for example. Information from the MAM devices can be read and immediately transmitted to the magazine auxiliary memory device 212, or alternatively, the information of each MAM device can be stored on the auxiliary storage device 134 and then transferred to the magazine auxiliary memory device 212, just to name two examples. The magazine 200 provides an adequate environment to hold a set of protected tape cartridges 120.

There are advantages and disadvantages to all types of storage media. Tape media 195 can store more data in the same sized footprint (tape cartridge 120) than most other kinds of storage media due to the extremely long length of tape that is wrapped around a reel. Another advantage of tape media 195 is that tape cartridges 120, which house the tape media 195, are easily moved and do not require power to be connected to them for operation. Because tape media 195 linearly passes under a read/write head, data must be written and read sequentially. As previously discussed, in order to find specific data or data portions, data is split into data blocks and stored sequentially along the length of the tape medium 195, the blocks are separated by tape marks 190. The tape marks and file marks 190 function like speed bumps enabling quick access to specific blocks 193 and files. Formatting of the data blocks 193 and metadata associated with the blocks can be done a number of different ways, but most recently tape systems have been using Linear Tape File System (LTFS) format.

Figure 5:
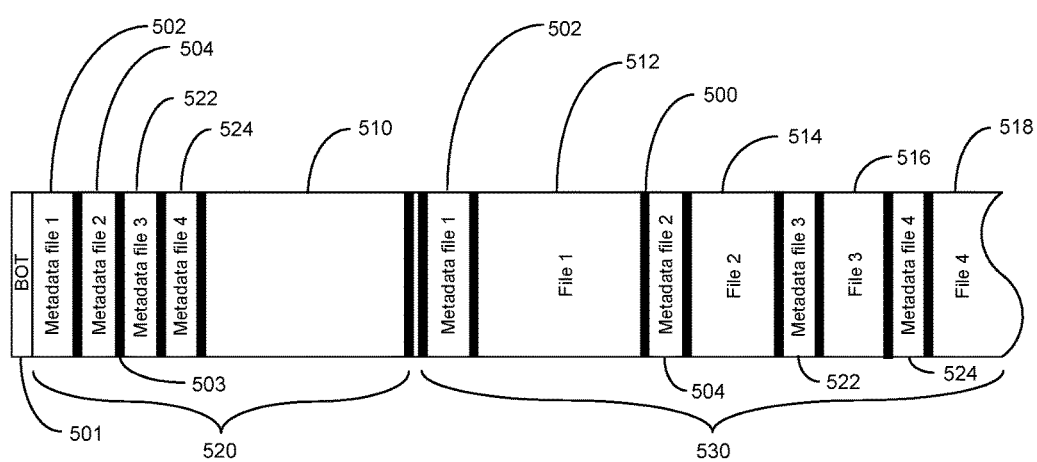
FIG. 5 illustratively depicts a basic block diagram schematic of LTFS formatted tape data recorded to a tape medium constructed in accordance with certain embodiments of the present invention.

The Linear Tape File System format is a self-describing tape format developed by IBM to efficiently locate file information retained in a given tape cartridge 120. More specifically, LTFS format defines the organization of data and metadata on tape media more similarly to the way files, or data objects, are accessed and stored in hard disk drives or flash drives. A data object can include one or more files. FIG. 5 illustratively depicts a very fundamental schematic of LTFS format. The tape media 195 essentially possesses an index partition 520 (containing metadata of the user data files) and a user data partition 530. If two files are stored to the tape medium 195, via a tape drive 130, the metadata for File-1 502 and the metadata for File-2 504 are written in the beginning of the index partition 520 with File-1 512 and File-2 514 being written to the user data partition 530. If later on File-3 516 is written to the user data partition 530, metadata for File-3 522 is appended to the index partition 520 after the first set of metadata as shown: metadata file-1 502, metadata file-2 504, and metadata file-3 522. If later on File-4 518 is written to the user data partition 530, metadata for File-4 524 is written in the index partition 520 after the metadata for file 3 522. Tithe metadata in the index partition 520 is separated by marks 503. As shown, there is free metadata space 510 still available in the index partition 520 for additional sets of metadata. Separating the files in the user data partition 530 are file marks 500. Optionally, the files may be segmented into blocks, or records, with tape marks (not shown). Also depicted, is a Beginning-of-Tape (BOT) mark 501. Because the files stored in LTFS format are in a hierarchical directory structure, data tapes written in LTFS format can be used independently of any external database—storage systems are allowed direct access to file content data in file metadata. This format makes it possible to implement software that presents a standard file system view of the data stored in tape media 195. The IBM LTFS Single Drive Edition product software was developed by IBM to implement a tape-based filesystem using the LTFS format. This software implements the LTFS format and allows tape to be formatted as an LTFS volume. These LTFS volumes can then be mounted to a tape drive 130 using the LTFS software allowing users and applications direct access to files and directories stored on the tape. The software is open sourced.

Figure 6A:
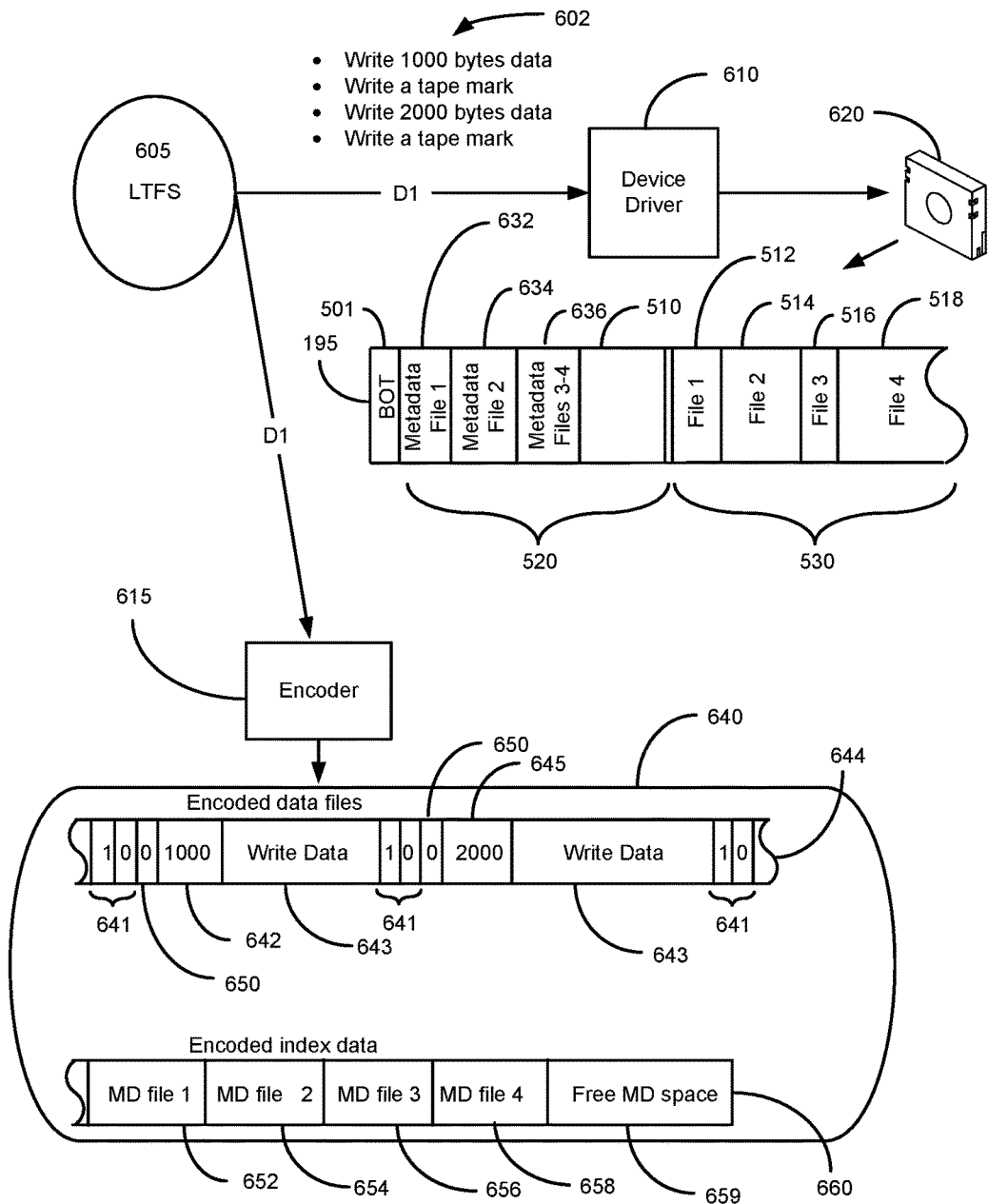
FIG. 6A illustratively depicts a schematic of an embodiment for encoding data streams consistent with embodiments of the present invention.

FIG. 6A depicts a schematic of an embodiment for encoding data streams consistent with embodiments of the present invention. As illustratively shown, a computing system using an LTFS system interface 605 transmits data stream D1 to a device driver 610 that formats D1 into a tape format that is transmitted to a tape drive 130 and written to a first tape cartridge 620. Certain embodiments of the present invention contemplate the LTFS system interface 605 and device driver 610 both in a software environment inside of a single server/controller system, such as a Black Pearl server/controller system from Spectra Logic Corporation, of Boulder, Colo. Optionally, the LTFS system interface 605 can be a computer system, server, controller system, and the like. The LTFS system interface 605 can process LTFS software to format and communicate with the device driver 610. The tape format (written to tape medium) can include blocks with tape marks and file marks, metadata, etc. Certain embodiments envision the device driver 610 being a SCSI device driver that is built into the Archive Storage Controller 101, such as the Black Pearl. As depicted, the data stream D1 is also transmitted to an encoder 615, which creates a digital representation of the data stream D1 that can be stored to one or more hard disk drives, one or more solid state drives, or some other random access storage memory within the scope and spirit of the present invention. Certain embodiments contemplate the data stream D1 being transmitted to the device driver 610 for at least a period of time while being transmitted to the encoder 615, e.g., coincidently, essentially at the same time, with a slight delay, partially overlapping in time, etc., while other embodiments contemplate the data stream D1 being transmitted to the device driver 610 at a different time than when D1 is transmitted to the encoder 615. The encoder 615 can be constructed in hardware or software as long as it functionally encodes, or converts, the data stream, such as D1, into digital sequences that represents tape format structure. Tape format structure may include block commands, tape marks, beginning of tape commands, end of tape commands, beginning of file commands, end of file commands, and/or other types of tape format structure.

By way of example, the embodiment of FIG. 6A depicts the LTFS system interface 605 in communication with the device driver 610 whereby a portion of the data stream D1 602 is being transmitted to the device driver 610, as shown. This example assumes that the metadata files 1-4 632-636 have already been transmitted to both the device driver 610 and the encoder 615 and written to the tape cartridge 620 in the index partition 520 as well as the disk drive system 640, which records the encoded format of the appended index partition information. The disk drive system 640 is envisioned to comprise a plurality of hard disk drives, however other embodiments contemplated envision a single hard disk drive, solid state drive/s, or combination of hard disk drives and solid state drives, or other random access memory within the scope and spirit of the present invention. The exemplified portion of data stream D1 602 is a portion of File-4 518 that includes instructions from the LTFS system interface 605 to the device driver 610 to a) write 1000 bytes of data, b) write a tape mark, c) write 2000 bytes of data, d) write a tape mark, etc. The exemplified data stream D1 of File-4 518 is formatted for the first tape cartridge 620 where it is sent to a tape drive 130 and written to the first tape cartridge 620 as formatted by the tape drive 130.

Meanwhile, the exemplified data stream D1 602 is also sent to the encoder 615, which converts the exemplified data stream D1 602 into digital data that is independent of the tape formatted data residing on the first tape cartridge 620. The encoder 615 is a software program running on a processor in a computer system that converts the data stream D1 and the commands from the LTFS system interface 605 into a set of digital instructions and user data that too is in a single stream. The LTFS instruction to "write 1000 bytes data" is encoded to write data bytes corresponding to a "write command" of zero bytes length signified by a "0" 650, that is "1000" bytes long 642 followed by the 1000 bytes of "user data" 643. The next LTFS instruction to "write a tape mark" is encoded as a "1,0". "Write 2000 bytes data" is encoded to start with data bytes corresponding to a "write command" of zero bytes length signified by a "0" 650, that is "2000" bytes long 645 followed by the 2000 bytes of "user data" 643. The next LTFS instruction is to "write a tape mark" is encoded as a "1,0" 641. The encoded stream of data 644 starts with a tape mark 641, just for reference. As previously mentioned, the disk drive system 640 parallels the index partition 520 on the tape cartridge 620, whereby the disk drive system stores the appended File-4 metadata in an encoded format of the LTFS format instructions for the index partition 520. Hence, as depicted in the logical index partition on the disk drive 660, metadata files 1, 2, 3 and 4 652-658, and a logical tag indicating how much free space 659 remains in the metadata is recorded in the encoded format by the encoder 615. Unlike other methods of storing metadata in an encoded tape format, which uses tables and pointers, the encoded data 644 and 660, in certain embodiments are envisioned as being written as one sequential data stream. Certain embodiments contemplate the encoded index data 660 being a separate data stream from the encoded data files 644. Yet other embodiments contemplate that the encoded data stream D1 is parceled by the hard disk drive system 640 in sectors, which is routinely done by disk drive software, or pages in SSD systems (Solid State Drive).

Figure 6B:
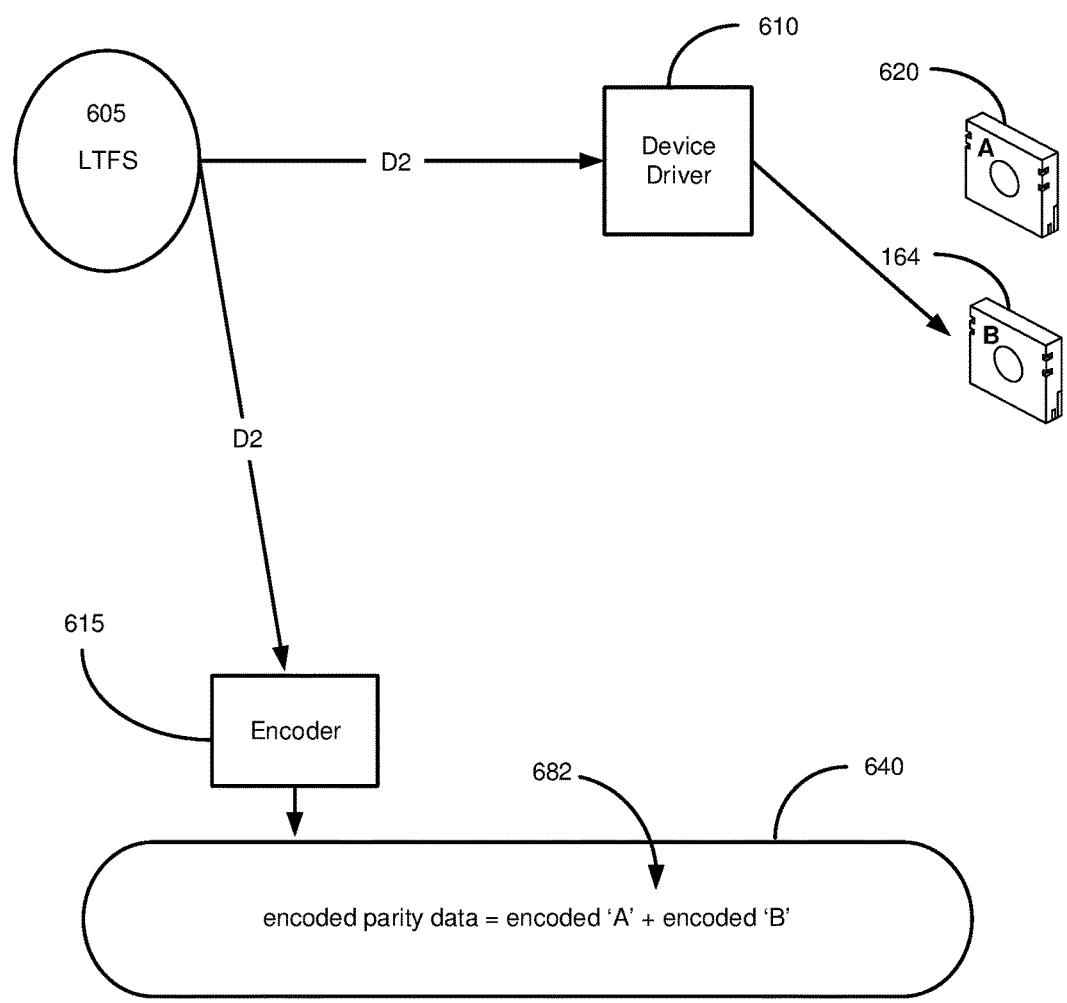
FIG. 6B illustratively depicts a schematic of an embodiment for storing data stream D2 to a second tape cartridge in the tape set consistent with embodiments of the present invention.

FIG. 6B depicts storing data stream D2 to a second tape cartridge 164 in the tape set consistent with embodiments of the present invention. In a similar fashion to storing data stream D1 to the first tape cartridge 620 and the hard disk drive system 640 of FIG. 6A, data stream D2 is a) transmitted to the device driver 610, which formats the data for tape storage and sends to a tape drive 130 that stores the tape formatted data to a second tape cartridge 164 (Tape "B"), and b) transmitted to the encoder 615, which encodes D2 consistently with how D1 was encoded. The encoded D2 can then be added to encoded D1 data (by aligning the bits of encoded D2 with encoded D1) to generate encoded parity data of encoded data streams D1 and D2 682. In this way, all encoded data can be added in parity independent of file and block formats, tape marks, etc. Certain embodiments contemplate encoded D2 buffered and then added to encoded D1 while other embodiments contemplate adding encoded D2 to encoded D1 while encoded D2 is being sent to the hard disk drive storage 640, possibly on the fly (i.e., not storing D2, but rather building parity as D2 data bits come in). Other embodiments contemplate buffering portions of encoded D2 and generating encoded parity data of like sized portions of encoded D1. Certain embodiments also contemplate padding either encoded D1 or encoded D2 with zeros if one is larger than the other. Generating the parity data can be repeated with additional data streams until the tape set, such as the tape set depicted in FIG. 4, is completed.

Figure 7:
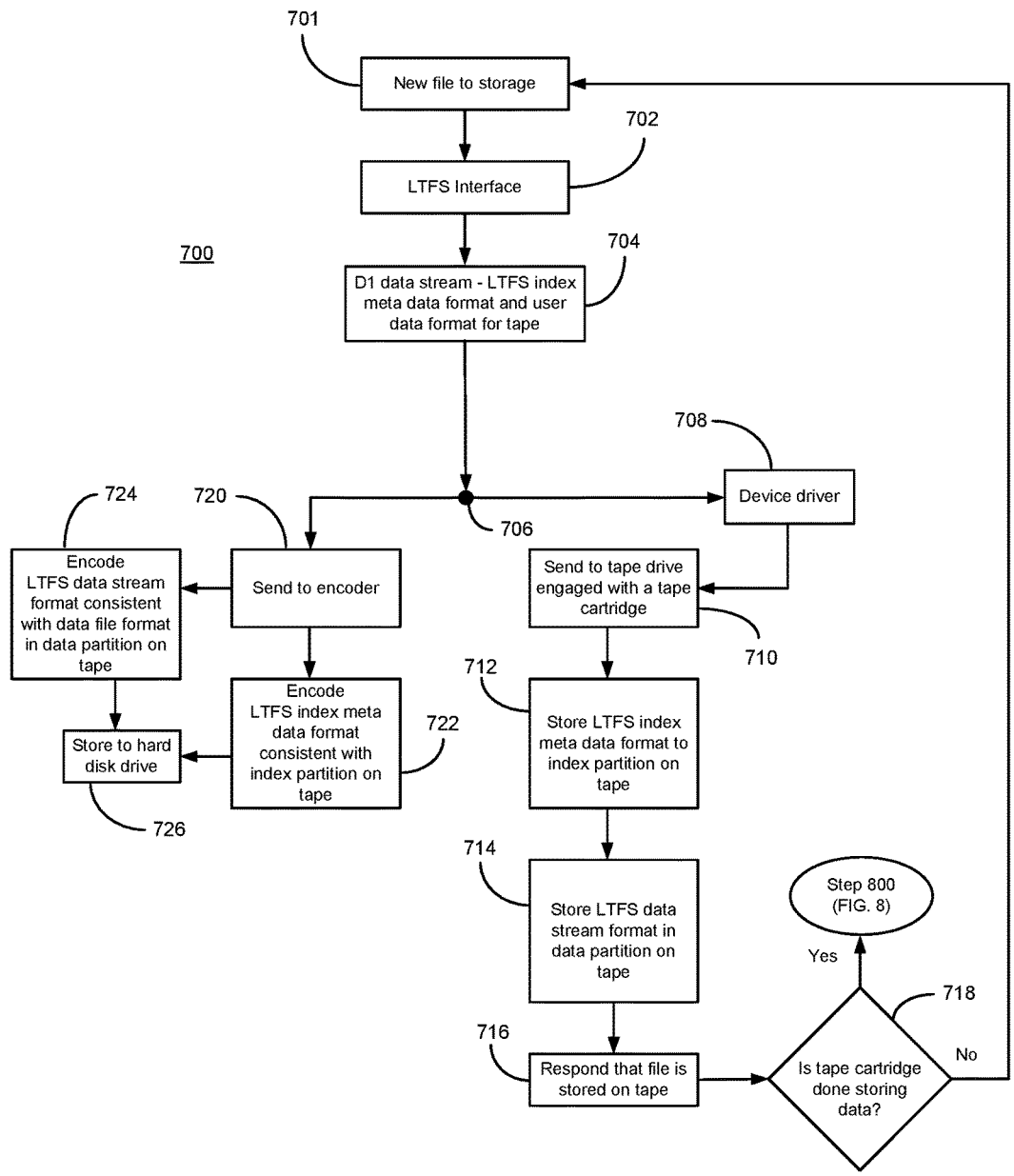
FIG. 7 is an embodiment of a block diagram of method steps that can be used in conjunction with FIGS. 6A and 6B consistent with embodiments of the present invention.

FIG. 7 is a block diagram 700 of method steps that can be used in view of FIGS. 6A and 6B consistent with embodiments of the present invention. As depicted in FIG. 6A, a new incoming file (or files) intended to be stored (such as File-1), step 701, is received by the LTFS system interface 605, step 702. Certain embodiments contemplate the incoming file/s sent generically to be stored to a disk drive system, or the like, without knowledge or concern of tape being used, let alone being formatted for tape. As indicated by step 704, the LTFS system interface 605 formats the new file such that the index metadata is formatted for an index partition 520 and the user data is formatted for the user data tape partition 530 on a tape cartridge 620. The LTFS formatted data is sent as a data stream D1 intended for tape storage to both the tape cartridge 620 and to a hard disk drive/s 640 that stores encoded D1 data, point 706. The data stream D1 going to tape is formatted for tape by the device driver 610, block 708, prior to sending to a tape drive 130 (the tape drive 130 being engaged in a read/write relationship with the tape cartridge 620, block 710). Blocks 712 and 714 are steps to store LTFS index data to the index data partition and to store LTFS user data in the data partition on the tape cartridge 620. When finished, the tape drive responds ultimately to the sender of the data that the file/s is stored on tape 716. The next block 718 is a decision whether or not the tape cartridge 620 is done storing data, e.g., the tape cartridge is full or otherwise done receiving data for a specific data set. If the tape cartridges 620 is not full then it can receive another new file to be stored thereon—go back to block 701. If the tape cartridge 620 is full, or otherwise done receiving data, proceed to step 800, FIG. 8.

Referring back to point 706, though the data stream D1 intended for tape goes both to the device driver 610 and to the encoder 615, if the data stream D1 is being directed to the encoder 615, as indicated by step 720, the data stream D1 is encoded in a format that facilitates parity generation whereby the LTFS index metadata (formatted consistently with the index partition 520 on tape—i.e., using the same model as the format to tape) is encoded and the LTFS data stream (formatted consistently with the data file format and the data partition 530 on tape) is encoded, block 722 and 724 respectively. The encoded index partition information and encoded data partition information are then stored to the hard disk drive system 726. Certain embodiments contemplate building the encoded index metadata partition and the encoded data partition in the hard disk drive system 640 in a sequential format like that which is done in the tape format. This can be done by writing zeros to pad the index partition after the appended meta-data in the hard disk drive system 640 to meet the size of the index partition 520 on the tape cartridge 164. Optionally, this can be more efficiently done by writing an encoded instruction of how many bytes logically remain available for more metadata in the index partition without writing zeros to fill up the index partition on the hard disk drive system 640.

Figure 8:
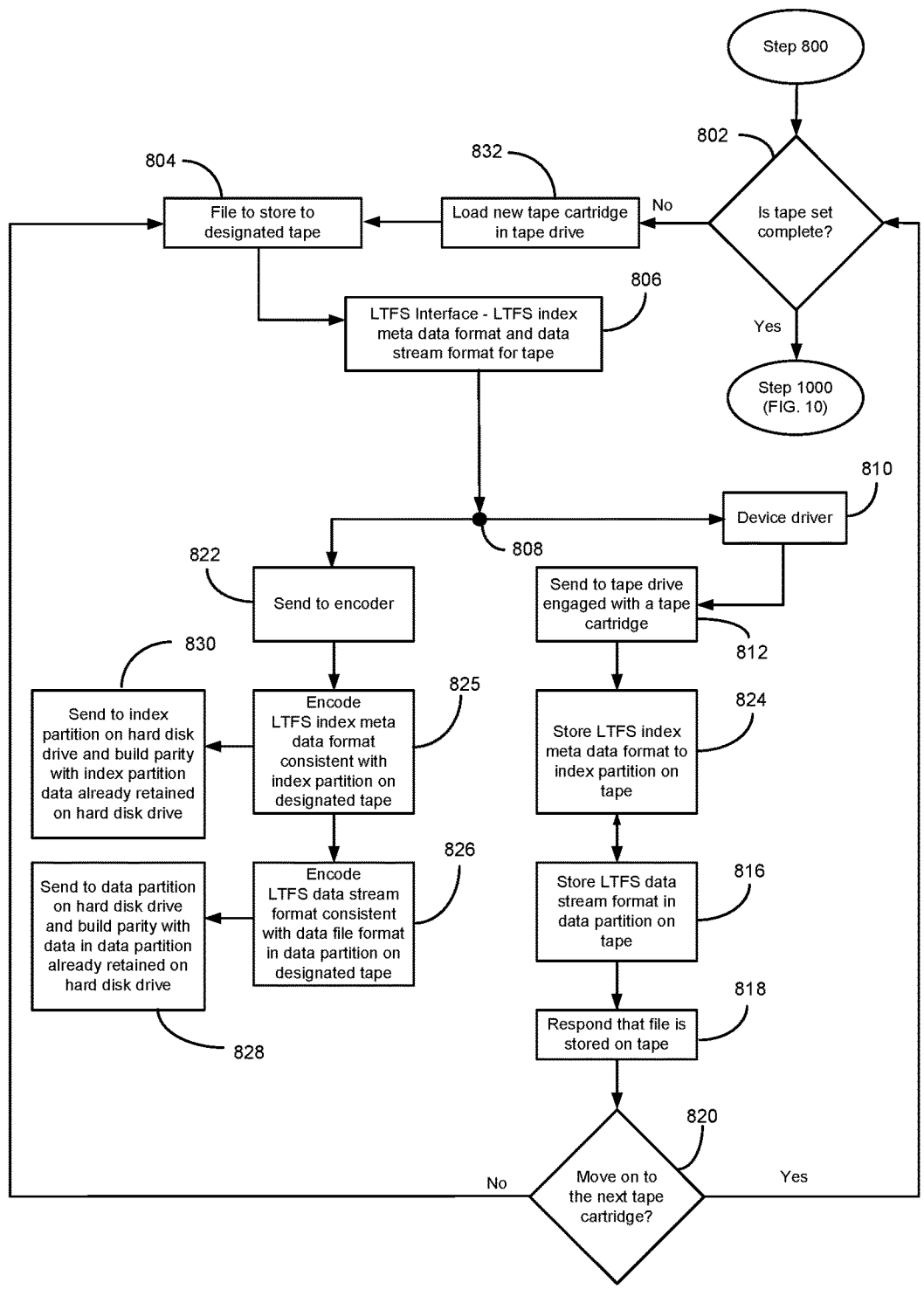
FIG. 8 is an embodiment of a block diagram of method steps for building parity, which can be used in conjunction with FIGS. 6A and 6B consistent with embodiments of the present invention.

FIG. 8 continues on from FIG. 7 at the decision block 718 whereby the tape cartridge needs to be replaced, such as, for example if the tape cartridge has insufficient room to store more data. Decision step 802 determines if the tape set is complete or not. For reference purposes and ease of discussion, the tape set of FIG. 4 will be used in the description of the steps. The tape set includes Tape 'A' 162, Tape 'B' 164, Tape 'C' 166, and Tape 'D' 168. Following that designation, and in view of FIG. 6B, assuming the next tape cartridge in the tape set is Tape 'B' 164 (and is loaded in a tape drive 130, step 832), then a new file sent from a user or host to store in the tape set, block 804, is sent to the LTFS interface 605 where LTFS metadata format and data stream format for new tape cartridge 'B' are generated D2, step 806. As before, D2 is sent to both the device driver 610 and the encoder 615 as depicted by node point 808. When D2 is sent to the device driver 610, block 810, D2 is formatted for tape and sent to the tape drive 130 engaged with Tape 'B' 164 the data is stored, step 812. As with the first tape cartridge, Tape 'A' 162, the LTFS index data is stored to the LTFS index partition 520 and the LTFS data stream is stored to the data partition 530, steps 824 and 816. As with all storage related instructions, the server, or data source, which sent the data file/s in the first place, is informed that the file has been stored to tape, step 818. The decision at this point is whether or not move to the next tape cartridge, from Tape 'B' 164 to Tape 'C' 166, step 820. If Tape 'B' 164 is available to continue storing data, then repeat and proceeds storing a new file. If Tape 'B' 164 is unavailable to store more or new data, the next decision 802 is whether or not Tape 'B' 164 completes the tape set. If not, simply load a new tape cartridge from the tape set (Tape 'C' 166) to a tape drive, step 832 and proceeds with the storage steps starting with step 804.

Meanwhile, back to the node point 808, the data stream D2 is also sent to the encoder 615, step 822, where D2 is encoded in a way that is consistent with the tape layout of the data stored on Tape 'B' 164, steps 825 and 826. By consistent with the tape layout, it is envisioned that there is data being stored to an index partition 660 and data partition 644 that are sequentially laid out so that parity data being used to build a parity tape is laid out sequentially on tape. In this way, tables with meta-data and the like do not have to be used. The encoded data stream D2 is then sent to the hard disk drive system 640 where parity data 682 can be built from the encoded data stream D1, steps 828 and 830. The disk drive system 640 is intelligently directed to add the encoded data to build parity corresponding to the data stored to each individual tape cartridge. Certain embodiments contemplate, the encoded data stream D2 being stored to the hard disk drive system 640 followed by parity data being built between encoded D1 and D2. Yet, other embodiments contemplate the encoded data stream D2 being added to D1 to generate parity data as the encoded D2 data is coming in from the encoder 615 (on the fly). While, other embodiments contemplate portions of encoded D2 being added with encoded D1 to generate parity data portion by portion as encoded portions of D2 are received from the encoder 615. When Tape 'C' 166 is loaded in a tape drive 130 the data stream D3 transmitted to Tape 'C' 166 is likewise encoded and added to the parity data. In this way, the encoded data paralleling the data sent to Tape 'A' 162, Tape 'B' 164, Tape 'C' 166, and Tape 'D' 168 are aligned (bit by bit) and added to generate parity data. In other words, in a simple form D1 (corresponding to the data sent to Tape 'A' 162) is encoded to generate encoded D1 and is aligned and added to encoded D2 (data stream D2 corresponding to the data sent to Tape 'B' 164), which is then aligned and added to encoded D3 (data stream D3 corresponding to the data sent to Tape 'C' 166), which is then aligned and added to encoded D4 (data stream D4 corresponding to the data sent to Tape 'D' 168). The end result is an encoded parity of encoded D1, D2, D3, and D4.

Figure 9:
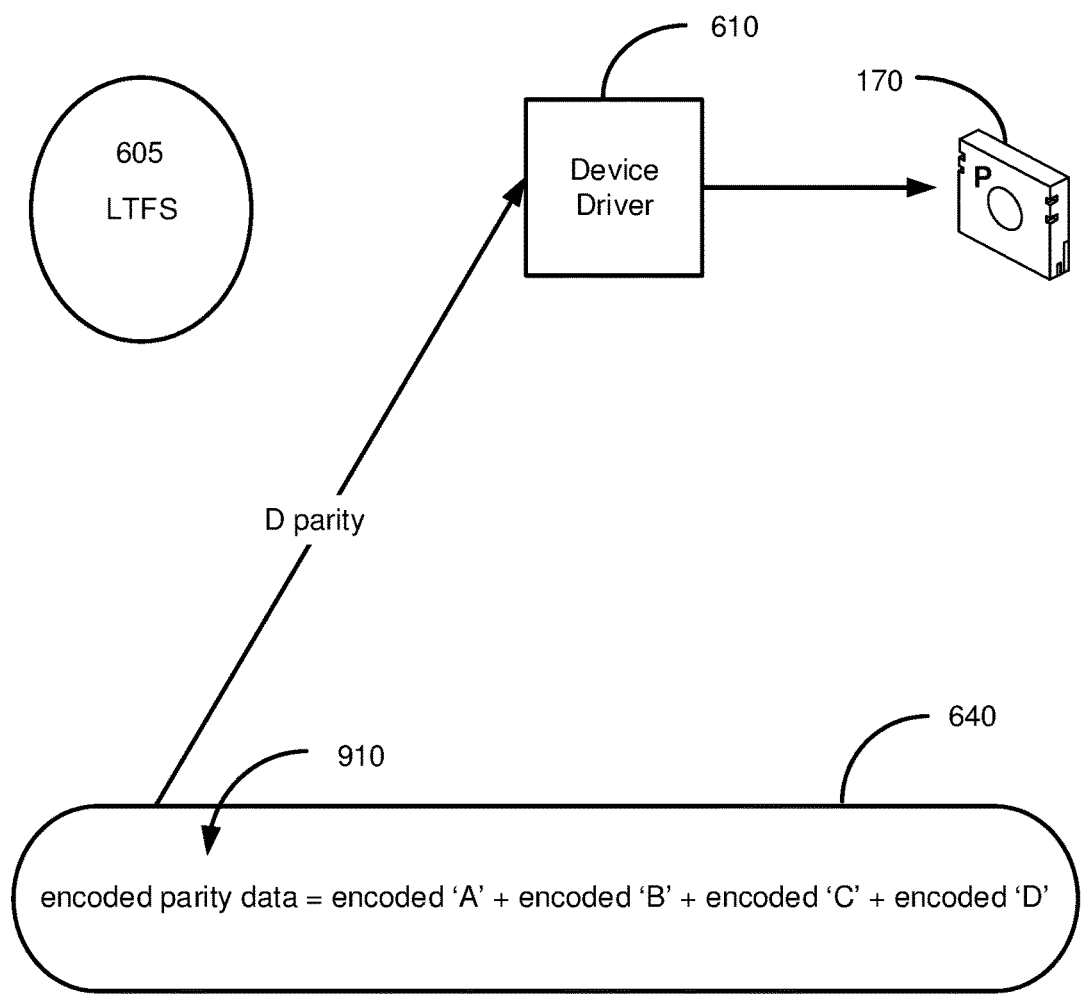
FIG. 9 illustratively depicts an embodiment of storing parity data from the hard disk drive system to a tape cartridge constructed in accordance with certain embodiments of the present invention.
Figure 10:
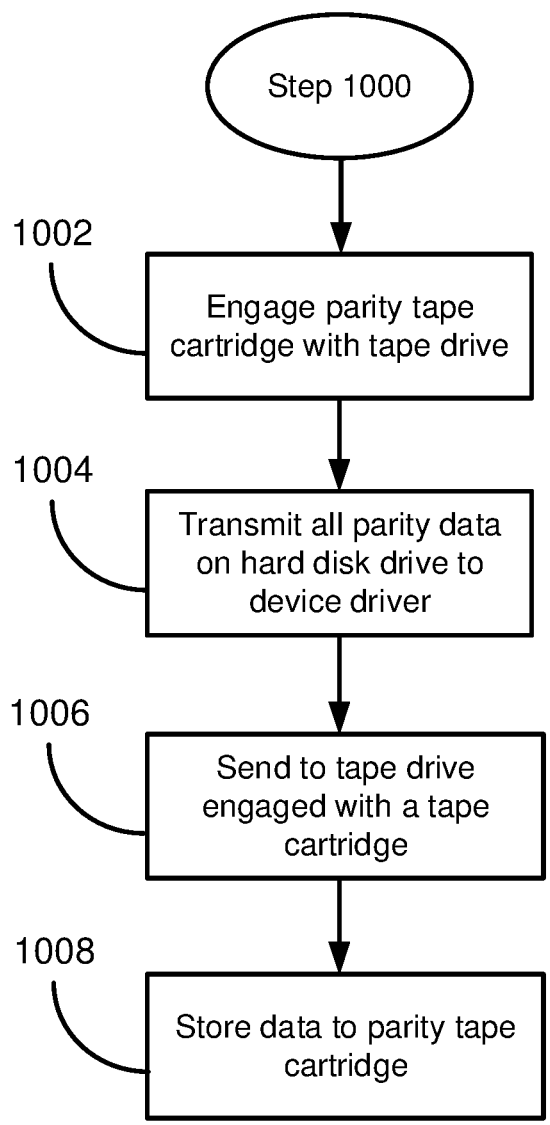
FIG. 10 is a block diagram of steps for an embodiment of storing parity data used in conjunction with FIG. 9 constructed in accordance with certain embodiments of the present invention.

FIG. 9 in view of FIG. 10 depicts an embodiment of a method for storing parity data from the hard disk drive system 640 to parity tape cartridge 170 consistent with embodiments of the present invention. Step 1000 continues on from FIG. 8 wherein it is determined that a tape set is complete (decision 802), such as, Tape 'A' 162, Tape 'B' 164, Tape 'C' 166, and Tape 'D' 168. As shown, the encoded parity data 910, D parity, is streamed to the device driver 610 as a continuous unformatted stream of data, step 1004. D parity passes from the device driver 610 (formatted to the tape drive) to a tape cartridge engaged with a tape drive, steps 1006 and 1002. The tape cartridge 170 containing the parity data is designated (and mapped) as a parity tape cartridge to the tape set, step 1008. Certain embodiments contemplate retaining a copy of the encoded parity data in the hard disk drive system 640, while other embodiments contemplate purging the disk drive system 640 of the parity data and any other tape data from the tape set.

Figure 11A:
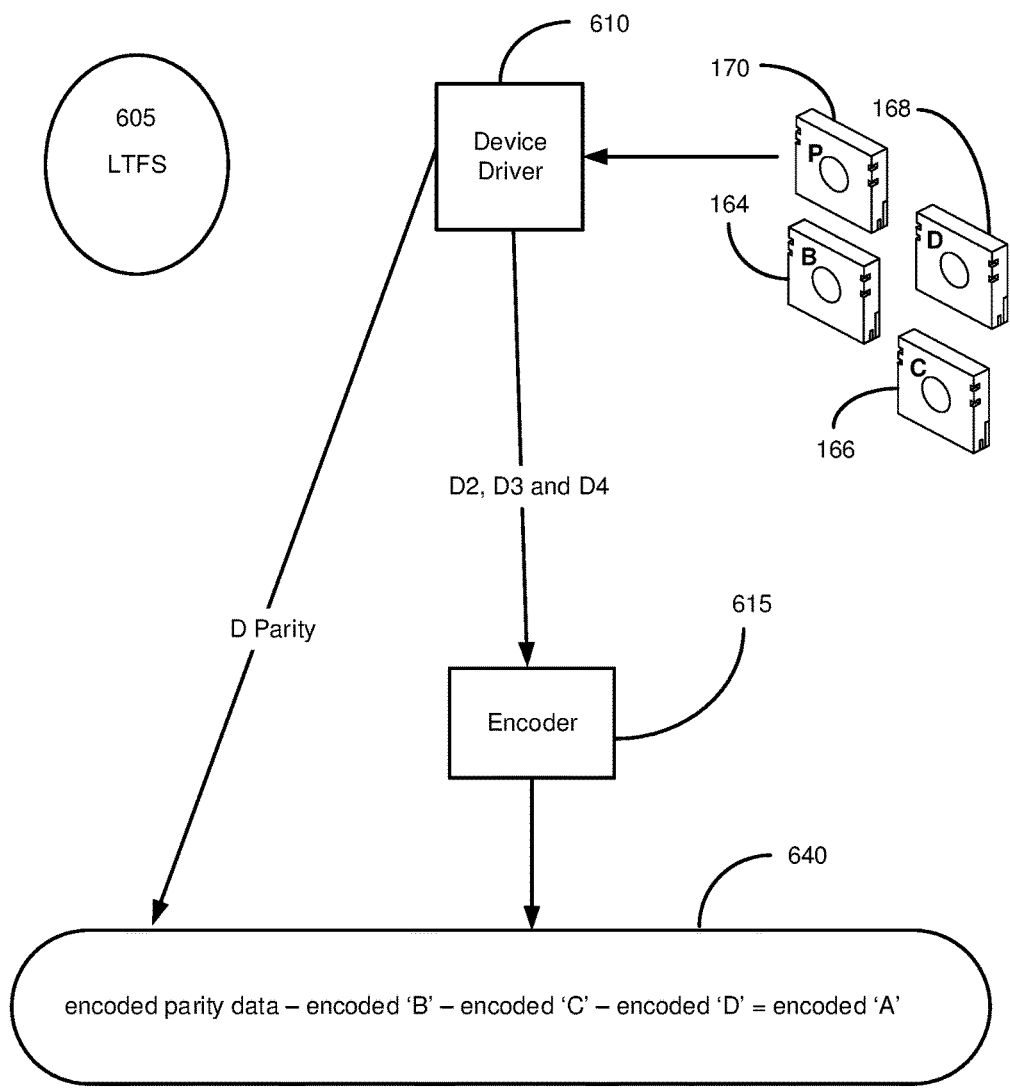
FIG. 11A illustratively depicts an embodiment for retrieving encoded data from a damaged or missing tape cartridge consistent with embodiments of the present invention.
Figure 12:
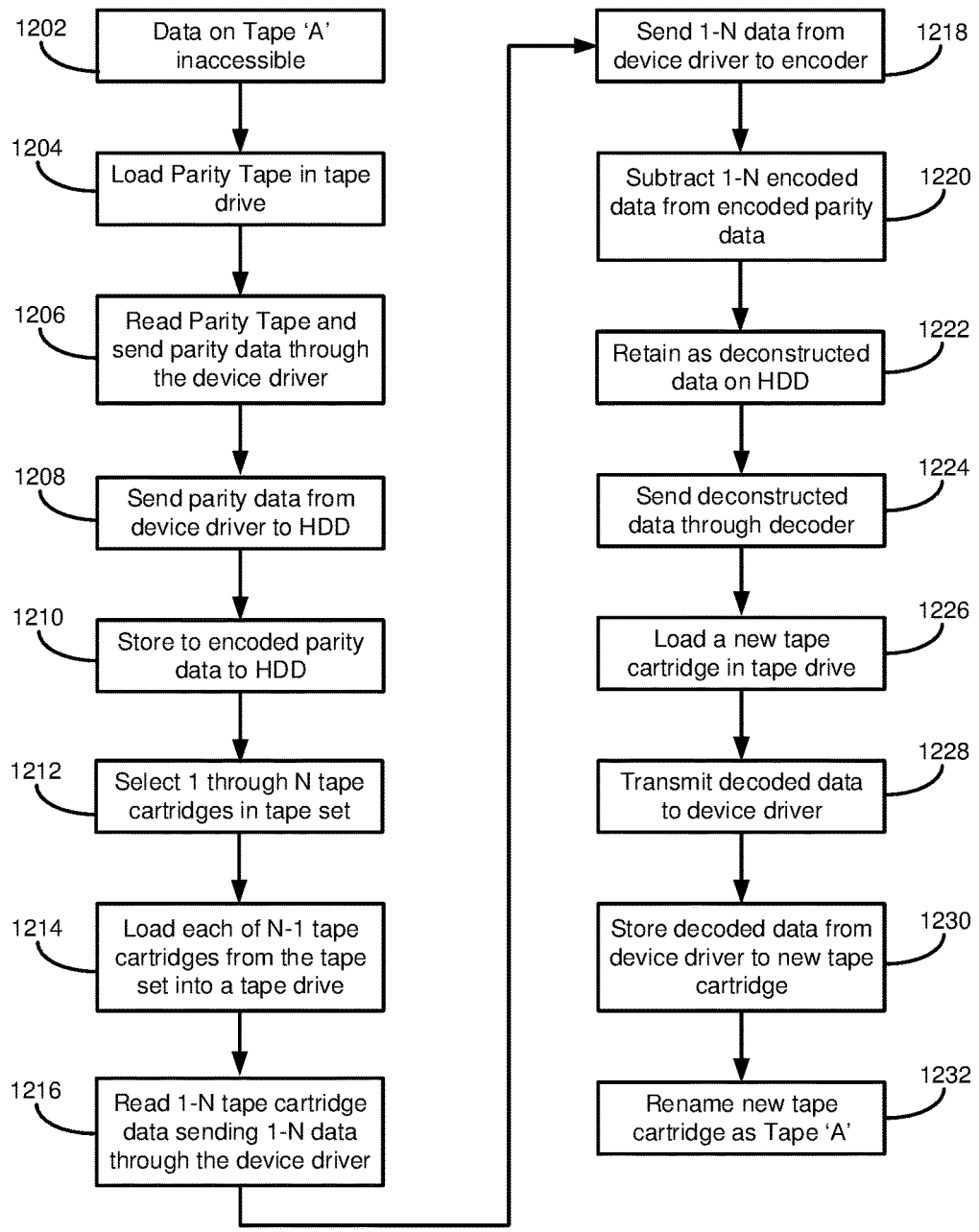
FIG. 12 is a block diagram of steps one embodiment for retrieving encoded data used in conjunction with FIG. 11 consistent with embodiments of the present invention.

FIG. 11A in view of FIG. 12 depicts an embodiment of a method for retrieving encoded data from a damaged or missing tape cartridge consistent with embodiments of the present invention. By way of illustration, assume that Tape 'A' 162 has been damaged and all of the data thereon lost/inaccessible, block 1202. Tape 'A' 162 can be rebuilt by first loading the parity tape cartridge, Tape 'P' 170 in a tape drive 130 (step 1204) and reading the tape data (that is in a tape format) through the device driver 610, step 1206. After the data of Tape 'P' 170 has been read through the device driver 610 the parity data, or D parity, is sent directly to the hard disk drive system 640 (step 1208) and stored to the disk drive system 640 (step 1210). Though any of the tapes 'B'-'D' can be chosen first, for simplicity, assume Tape 'B' is loaded in the tape drive 130, or optionally a different tape drive, step 1214, the data from Tape 'B' 164 is read through the device driver 610 (step 1216) re-generating data stream D2. Certain embodiments contemplate multiple tape drives reading data from multiple tape cartridges from the tape set approximately at the same time or overlapping times to improve efficiency in the rebuilding process of Tape 'A', for example. D2 is sent to the encoder 615 where D2 is encoded, step 1218, and sent to the hard disk drive system 640. Certain embodiments contemplate deconstructing the encoded parity information 910 retained on the hard disk drive system 640 by subtracting the encoded D2 data on the fly, while other embodiments contemplate deconstructing the encoded parity information 912 on the fly with portions of encoded D2 or bit by bit from encoded D2 (step 1220). Yet other embodiments contemplate loading the encoded D2 on the disk drive system 640 for later deconstruction of the encoded parity information 910. After all of the tapes in the tape set have gone through this process of steps 1216-steps 1220, what remains is encoded D1. In other words, encoded D1=encoded parity data-encoded D2-encoded D3-encoded D4.

Figure 11B:
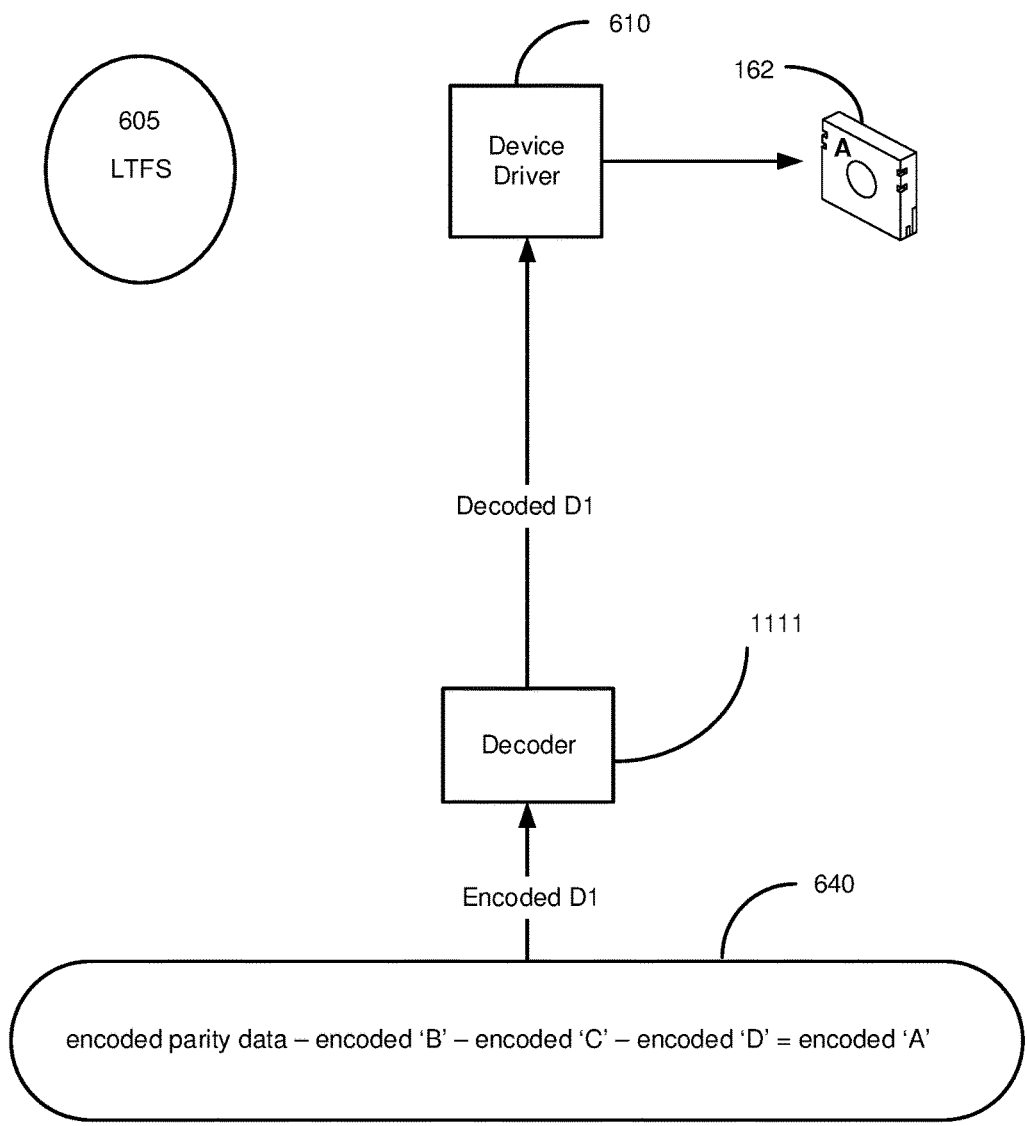
FIG. 11B illustratively depicts an embodiment for recreating and replacing a data cartridge consistent with embodiments of the present invention.

FIG. 11B in view of FIG. 12 depicts an embodiment of a method for recreating and replacing the data tape cartridge that is damaged, or missing, consistent with embodiments of the present invention. With reference to FIG. 11B, encoded D1 (deconstructed data) is transferred to the decoder 1111 from the hard disk drive system 640, step 1224, where the encoded data stream D1 is reconstructed to include tape format instructions, such as LTFS formatted instructions. In other words, by sending the encoded D1 through the decoder 1111 (which operates in an inverse function as the encoder 615), D1 is reproduced. The decoded data stream, D1, is sent from the decoder 1111 to the device driver 610 where D1 is formatted for tape and sent to a tape drive 132 that is loaded with a new tape cartridge 120 (step 1226). Once the data is written to tape, New Tape 'A' 162 is recreated, step 1130. New Tape 'A' 162 replaces old Tape 'A' 162 in the tape set.

Figure 13:
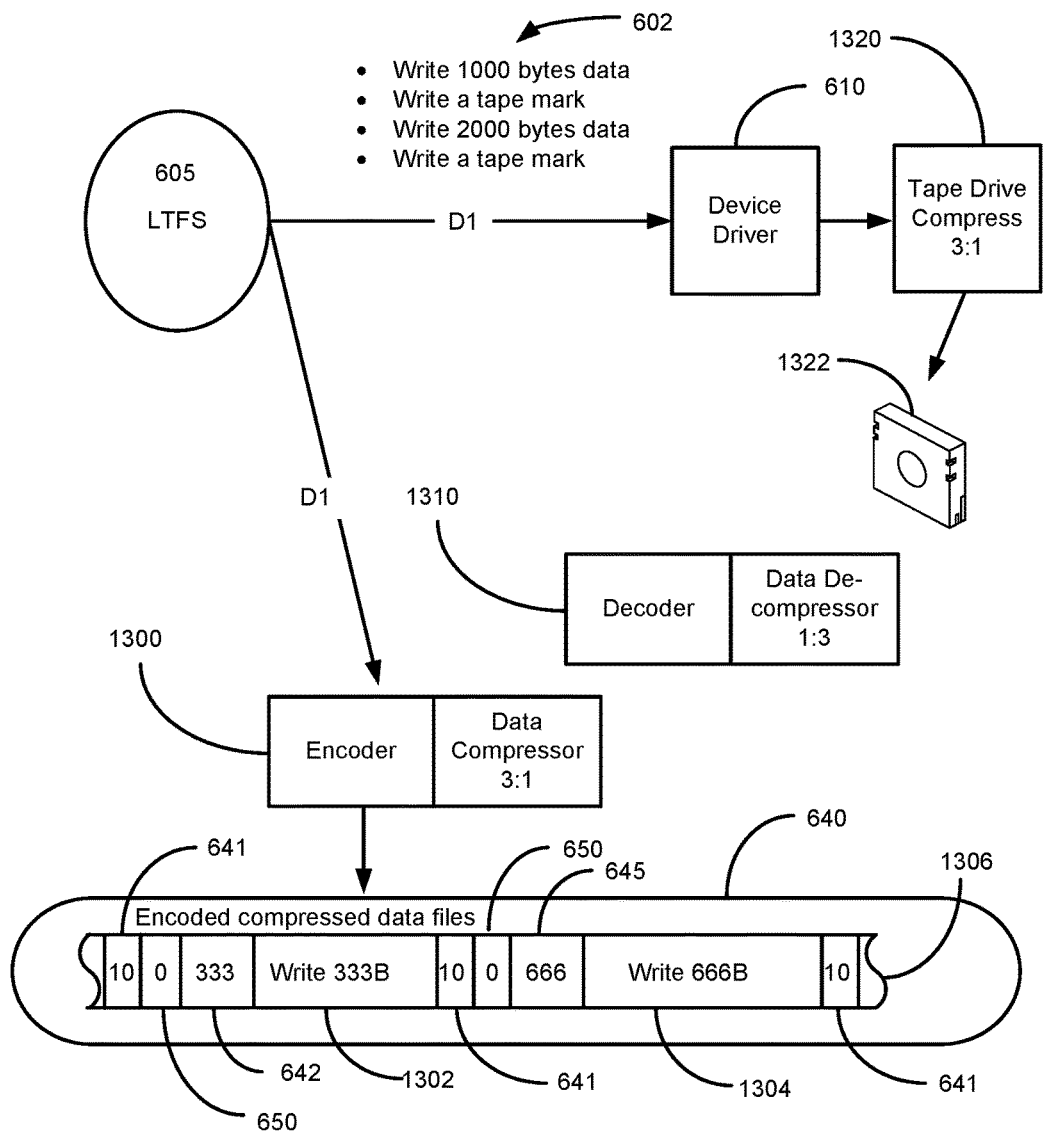
FIG. 13 illustratively depicts an embodiment of storing encoded data to the hard disk drive system with data compression similar to that used by a tape drive consistent with embodiments of the present invention.

FIG. 13 depicts a data compression embodiment consistent with embodiments of the present invention. Often, data is compressed via a tape drive 130 stored to a tape cartridge 120 in order to better utilize storage capacity of the tape cartridge 120. In the example of FIG. 13, data is compressed by the tape drive 1320 in a 3:1 ratio, or for about every 33 bytes of compressed data there is 100 bytes of uncompressed (raw data). Similar to FIG. 6A, the LTFS system interface 605 is in communication with the device driver 610 while transmitting an exemplified portion of the data stream D1 602. The exemplified portion of data stream D1 602 includes instructions from the LTFS system interface 605 to the device driver 610 to a) write 1000 bytes of data, b) write a tape mark, c) write 2000 bytes of data, d) write a tape mark, etc. The exemplified data stream D1 is formatted for the first tape cartridge 1322 via the device driver 610 where it is sent to a tape drive 1320 and written to the first tape cartridge 1322 as formatted by the tape drive 1320 in a 3:1 data compression ratio.

Meanwhile, the exemplified data stream D1 602 is also sent to the encoder 615, which converts the exemplified data stream D1 602 into digital data that is independent of the tape formatted data residing on the first tape cartridge 620 and compresses the user data in a similar compression ratio to that which is compressed by the tape drive 1320, 3:1. The encoder 615 is a software program running on a processor in a computer system that converts the data stream D1 and the commands from the LTFS system interface 605 into a set of digital instructions and user data that is compressed similar to the compression ratio used by the tape drive 1320. The LTFS instruction to "write 1000 bytes data" is encoded to write data bytes corresponding to a "write command" of zero bytes length signified by a "0" 641, that is "333" bytes long 642 followed by the 333 bytes of compressed "user data" 1302. The next LTFS instruction is to "write a tape mark" is encoded as a "1,0". "Write 2000 bytes data" is encoded to start with data bytes corresponding to a "write command" of zero bytes length signified by a "0" 650, that is "666" bytes long 645 followed by the compressed 666 bytes of "user data" 1304. Certain embodiments contemplate instructions in the encoded stream of data indicating that a data block is compressed and possibly how much. The next LTFS instruction to "write a tape mark" is encoded as a "1,0" 641. The encoded stream of data 1306 starts with a tape mark 641, just for reference. One advantage to compressing the "user data", such as data 1302 and 1304, is that the hard disk drive system 640 has its free capacity, or unused storage space, being consumed at essentially the same rate as a tape cartridge, such as tape cartridge 1322. Another advantage is the parity tape should be sized to fit on a tape cartridge with similar data capacity as the other tape cartridges in the tape set. As discussed in conjunction with FIG. 6A, present embodiments use sequential data formats unlike traditional tape emulation methods wherein metadata and/or compressed data in an encoded tape format are linked with tables and pointers. In a manner like that which is discussed in FIG. 11B, the compressed data 1306 can be decompressed and decoded through a decoder/data decompressor engine 1310 when reconstructing a lost or damaged tape cartridge.

Figure 14:
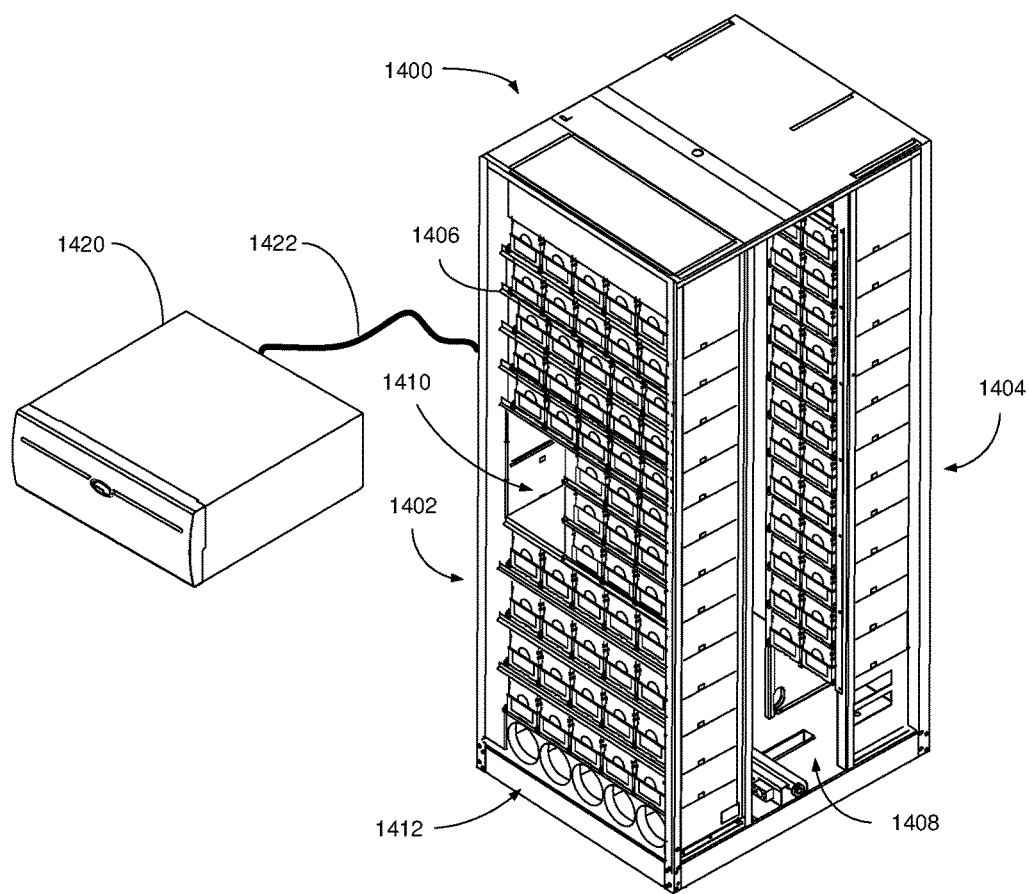
FIG. 14 illustratively depicts an example of a commercial embodiment of a library where embodiments of the present invention can be practiced.

Embodiments of the present invention can be commercially practiced in a Black Pearl archive storage system that possesses a Spectra Logic T-Finity tape cartridge library on the backend manufactured by Spectra Logic of Boulder Colo. FIG. 14 shows a commercial embodiment of one Black Pearl archive storage system 1420 communicatively linked with the T-Finity unit 1400 via a cable 1422. The T-Finity unit 1400 is shown without an enclosure, whereby the T-Finity unit 1400 is a single cabinet whereby multiple cabinets can be combined to make an expandable library. The Black Pearl archive storage system 1420 possesses archive storage controller (not shown) and a plurality of hard disk drives (not shown) and software that facilitates receiving data from a server (not shown), caching that data in at least one of the plurality of hard disk drives, running LTFS software, providing a device driver (such as a SCSI to format data streams to tape format), encoder/decoder software, compression software, and the like in addition to control storing data to tape cartridges in the T-Finity library 1400. The Black Pearl archive storage system 1420 can complete the methods described herein including sending tape formatted data to the tape library 1400 where a tape drive 130 and tape cartridge 120 can store (or retrieve) the received formatted data as described herein. The Black Pearl archive storage system 1420 is capable of handling all tape related storage commands without the server's involvement. The T-Finity unit 1400 comprises a first and second shelf system 1402 and 1404 that are adapted to support a plurality of the mobile media, such as tape cartridge magazines 1406 comprising a plurality of LTO-6 tape cartridges, archived in the library 1400. The second shelf system 1404 comprises at least one tape drive (not shown) adapted to read and write data to and from a tape cartridge. Functionally interposed between the first and second shelf system 1402 and 1404 is a magazine transport space 1408. The magazine transport space 1408 is adapted to provide adequate space for a tape cartridge magazine 1406 to be moved, via a magazine transport (not shown) and cartridge picker device (not shown), from a position in the first shelf system 1402, for example, to/near a drive. Tape cartridge magazines 1406 can be transferred into and out from the T-Finity library via an entry/exit port 1410. Transferring tape cartridge magazines 1406 in and out of the T-Finity library can be accomplished by an operator, for example. The T-Finity library comprises a means for cooling as shown by the fans 1412, located at the base of the unit 1400.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, more than one hard disk drive 110 can be used in conjunction with a tape drive 108, or more than one tape drive, to efficiently store redundant data within a library assembly while still maintaining substantially the same functionality without departing from the scope and spirit of the present invention. Another example can include using these techniques with different kinds of random access memory devices, such as solid state drives, or other, or a combination of hard disk drives, solid state drives, and other kinds of random access memory devices while still maintaining substantially the same functionality without departing from the scope and spirit of the present invention. Further, though block diagrams in the figures illustratively depict the LTFS system interface 605, the device driver 610, and the encoder 615 as different blocks, they can all be combined in one unit whereby the different blocks depict different functionalities that operates software and/or hardware to accomplish the tasks, for example, without departing from the scope and spirit of the present invention. Also, while certain embodiments described herein are directed to LTFS, which is by example and is not required. The concepts and embodiments herein can work with raw tape data streams or other data streams or formats without departing from the scope and spirit of the present invention. Further, for purposes of illustration, first and second tape cartridges are used herein to simplify the description for a plurality of (many) tape drives and tape cartridges. Also, the terms "one" is synonymous with "a", which may be a first of a plurality. Moreover, elements described herein as a first element (cartridge or drive for example) and second element is descriptive to mean a plurality of elements. Additionally, though there are five tapes cartridges including a parity tape cartridge used herein for example, it is contemplated that a variety of different numbers of tape cartridges can comprise a tape set and a variety of other data striping techniques can be used with a set of tape cartridges and random access storage memory device without departing from the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising:
providing a host computer in communication with a computer server, the computer server communicatively linked with a plurality of random access storage devices, a tape device driver, an encoding engine, and a tape cartridge library, the tape library possessing at least one tape drive, a first, a second and a third tape cartridge;
the computer server receiving an incoming first set of data objects from the host computer;
the server conditioning the incoming first set of data objects into a first data stream possessing instructions segmenting the incoming first set of data objects at least into a plurality of first data blocks and first tape marks;
sending the first data stream to the tape cartridge library via the tape device driver;
formatting for tape the first data stream via the tape device driver;
migrating the formatted first data stream to one of the tape drives that is engaged with the first tape cartridge;
storing the formatted first data stream to the first tape cartridge via the tape drive;
sending the first data stream to the encoding engine;
encoding all of the first data stream in a form that is sequential via the encoding engine; and
storing the first encoded data stream to the random access storage devices.

2. The method of claim 1 further comprising:
the computer server receiving an incoming second set of data objects from the host computer;
the server conditioning the incoming second set of data objects into a second data stream possessing second instructions segmenting the incoming second set of data objects at least into a plurality of second data blocks and second tape marks;
sending the second data stream to the tape cartridge library via the tape device driver;
formatting for tape the second data stream via the tape device driver;
migrating the formatted second data stream to one of the tape drives that is engaged with the second tape cartridge;
storing the formatted second data stream to the second tape cartridge via the one of the tape drives;
sending the second data stream to the encoding engine;
encoding all of the second data stream in the form that is sequential via the encoding engine; and
generating parity data of the first encoded data stream with the second encoded data stream;
storing the parity data to the random access storage devices.

3. The method of claim 2 wherein the parity data replaces the first sequential data form in the random access storage devices.

4. The method of claim 1 wherein the plurality of random access storage devices are selected from a group consisting of magnetic hard disk drives or solid-state drives.

5. The method of claim 3 further comprising:
loading the third tape cartridge in one of the tape drives;
sending the parity data from the random access storage devices to the tape device driver;
migrating the parity data from the tape device driver to one of the third tape cartridge loaded in one of the tape drives;
after the migrating step, storing the parity data to the third tape cartridge.

6. The method of claim 5 further comprising designating the third tape cartridge a parity tape cartridge after storing the parity data to the third tape cartridge.

7. The method of claim 6 further comprising removing the parity data from the random access storage device.

8. The method of claim 7 further comprising:
retrieving the parity data from the parity tape cartridge via one of the tape drives;
sending the parity data to the plurality of random access storage devices via the tape device driver;
storing the parity data to the random access storage devices;
regenerating the second data stream from the second tape cartridge via the tape device driver;
migrating the second data stream from the tape device driver to the encoding engine;
encoding the second data stream;
generating the encoded first data stream by subtracting the encoded second data stream from the parity data; and
retaining the encoded first data stream on the random access storage devices.

9. The method of claim 7 further comprising:
providing a decoding engine;
decoding the encoded first data stream from the random access storage devices via the decoding engine;
sending the decoded first data stream to the tape device driver;
formatting for tape the first stream via the tape device driver;
migrating the formatted first data stream to one of the tape drives that is engaged with a fourth tape cartridge;
storing the formatted first data stream to the fourth tape cartridge via the one of the tape drives.

10. The method of claim 7 further comprising replacing the first tape cartridge with the fourth tape cartridge.

11. The method of claim 1 wherein the plurality of random access storage devices, the tape driver and the encoding engine exists in the computer server.

* * * * *